(12) United States Patent
Coviello et al.

(10) Patent No.: US 12,743,317 B2
(45) Date of Patent: Sep. 22, 2026

(54) DYNAMIC RESOURCE MANAGEMENT FOR STREAM ANALYTICS

(71) Applicant: NEC Laboratories America, Inc., Princeton, NJ (US)

(72) Inventors: Giuseppe Coviello, Robbinsville, NJ (US); Kunal Rao, Monroe, NJ (US); Srimat Chakradhar, Manalapan, NJ (US); Priscilla Benedetti, Perugia (IT)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 18/474,658

(22) Filed: Sep. 26, 2023

(65) Prior Publication Data

US 2024/0118938 A1 Apr. 11, 2024

Related U.S. Application Data

(60) Provisional application No. 63/411,233, filed on Sep. 29, 2022.

(51) Int. Cl.
*G06F 9/50* (2006.01)

(52) U.S. Cl.
CPC .................................. *G06F 9/5055* (2013.01)

(58) Field of Classification Search
CPC ..................................................... G06F 9/5055
USPC .......................................................... 718/104
See application file for complete search history.

(56) References Cited

U.S. PATENT DOCUMENTS

| | | | | |
|---|---|---|---|---|
| 11,720,397 | B2 * | 8/2023 | Yamazaki | G06F 9/4856 718/100 |
| 2012/0317578 | A1 * | 12/2012 | Kansal | G06F 9/5077 718/104 |
| 2015/0363124 | A1 * | 12/2015 | Rath | H04L 67/51 709/219 |
| 2019/0325304 | A1 * | 10/2019 | Gottin | G06F 9/5077 |
| 2023/0315518 | A1 * | 10/2023 | Jung | G06F 9/5038 718/104 |
| 2024/0185098 | A1 * | 6/2024 | Kou | G06F 9/5027 |
| 2024/0428085 | A1 * | 12/2024 | Chalapathy | G06N 20/20 |

FOREIGN PATENT DOCUMENTS

| | | | | |
|---|---|---|---|---|
| CN | 112035949 | * | 4/2020 | |
| WO | WO-2022177566 A1 | * | 8/2022 | G06F 16/1824 |

OTHER PUBLICATIONS

Aydin, M. E., & Öztemel, E. (Dec. 1, 1999). Dynamic job-shop scheduling using reinforcement learning agents. Robotics and Autonomous Systems, 33(2-3), 169-178.

(Continued)

*Primary Examiner* — Charlie Sun
(74) *Attorney, Agent, or Firm* — Vincent Duffy

(57) ABSTRACT

A computer implemented method is provided for resource management of stream analytics at each individual node that includes computing a mean of output processing rate of microservices in a pipeline; and evaluating a state of each microservice of the microservices in the pipeline. The computer implemented method also includes selecting a single microservice from the pipeline for updating resources for an action that changes the state in single the microservice that is selected; and performing resource allocation update for the selected microservice. The computer implemented method may also include updating the state of the selected microservice.

16 Claims, 10 Drawing Sheets

(56) References Cited

OTHER PUBLICATIONS

Coviello, G., Rao, K., Sankaradas, M., & Chakradhar, S. (Nov. 9, 2021). DataX: A system for Data eXchange and transformation of streams. In International Symposium on Intelligent and Distributed Computing (pp. 319-329). Cham: Springer International Publishing.
Hong, C. H., & Varghese, B. (Sep. 30, 2018). Resource management in fog/edge computing: a survey on architectures, infrastructure, and algorithms. ACM Computing Surveys (CSUR), 52(5), 1-37.
Ma, C. Y., Kadav, A., Melvin, I., Kira, Z., AlRegib, G., & Graf, H. P. (Jun. 18, 2018). Attend and interact: Higher-order object interactions for video understanding. In Proceedings of the IEEE Conference on Computer Vision and Pattern Recognition (pp. 6790-6800).
Watkins, C. J., & Dayan, P. (May 1, 1992). Q-learning. Machine learning, 8, 279-292.
Zhang, W., & Dietterich, T. G. (Aug. 20, 1995). A reinforcement learning approach to job-shop scheduling. In IJCAI (vol. 95, pp. 1114-1120).
Belgacem, A., Mahmoudi, S., & Kihl, M. (Apr. 2, 2022). Intelligent multi-agent reinforcement learning model for resources allocation in cloud computing. Journal of King Saud University—Computer and Information Sciences, 34(6), 2391-2404.
Zhang, M., Zhu, Y., Liu, J., Wang, F., & Wang, F. (Dec. 21, 2022). Charmseeker: Automated pipeline configuration for serverless video processing. IEEE/ACM Transactions on Networking, 30(6), 2730-2743.
WG, C. S. (Mar. 1, 2018). Cncf wg-serverless whitepaper v1. 0.
Coviello, G., Yang, Y., Rao, K., & Chakradhar, S. (Dec. 6, 2021). Magic-pipe: Self-optimizing video analytics pipelines. In Proceedings of the 22nd International Middleware Conference (pp. 79-90).
Jiao, L., Zhang, R., Liu, F., Yang, S., Hou, B., Li, L., & Tang, X. (Aug. 1, 2022). New generation deep learning for video object detection: A survey. IEEE Transactions on Neural Networks and Learning Systems, 33(8), 3195-3215.
Liu, X., Yu, J., Wang, J., & Gao, Y. (Apr. 28, 2020). Resource allocation with edge computing in IoT networks via machine learning. IEEE Internet of Things Journal, 7(4), 3415-3426.
Xie, R., Tang, Q., Qiao, S., Zhu, H., Yu, F. R., & Huang, T. (Oct. 5, 2021). When serverless computing meets edge computing: Architecture, challenges, and open issues. IEEE Wireless Communications, 28(5), 126-133.

* cited by examiner

Table 1: Metrics composing resource QL model environment state

| Feature | Description | Type | Levels |
|---|---|---|---|
| Microservice resource allocation | Ratio of allocated resource for the microservice over the total available on the computing node. | Microservice Resource Profile | 10 |
| Microservice resource usage | Ratio of used resource for the microservice over the allocated quota for the microservice. | Microservice Resource Profile | 5 |
| Node available resource | Ratio of the hosting computing node's free resources over the total. | Node Resource Profile | 5 |
| Node used resource | Ratio of the hosting computing node's used resources over the allocated quota. | Node Resource Profile | 5 |
| Consumed average | Ratio of the consumed messages by following stage(s) in the pipeline over the total produced messages, averaged on the number of consumers. | Microservice Interactions Profile | 5 |
| Processed average | Ratio of the processed messages by the microservice over the total produced messages by the preceding stage(s) in the pipeline, averaged on the number of producers. | Microservice Interactions Profile | 5 |
| Depth | Ratio of the microservice's distance from the pipeline's driver over the maximum length path in the pipeline. | Topology | 5 |
| Reachability | Ratio of the reachable final pipeline's stages from the microservice over the total. | Topology | 3 |

FIG. 3

Table 2: Resource allocator performance evaluation test

| Test | Node Specs | Pipelines | Microservices per pipeline | Video Input |
|---|---|---|---|---|
| Action Recognition (AR) | 8 CPU, 48 GB RAM | 1 | 12 | Holiday |
| Face Recognition 1 (FR1) | 4 CPU, 64 GB RAM | 1 | 4 | Holiday |
| Face Recognition 2 (FR2) | 4 CPU, 64 GB RAM | 1 | 4 | TV News |
| Face Recognition 3 (FR3) | 4 CPU, 64 GB RAM | 2 | 4 | Holiday, TV News |

FIG. 6

RESOURCE ALLOCATOR CPU UPDATE POLICY FOR FR1

DYNAMIC RESOURCE MANAGEMENT FOR STREAM ANALYTICS

RELATED APPLICATION INFORMATION

This application claims priority to U.S. 63/411,233 filed on Sep. 29, 2022, incorporated herein by reference in its entirety.

BACKGROUND

Technical Field

The present invention relates to stream analytics and more particularly to stream analytics involving edge devices.

Description of the Related Art

Stream analytics applications are growing along with the development of the Internet of Things (IOT) ecosystem. In order to extract information and augmented data from streams, these applications are typically deployed as pipelines of microservices on the edge of the computing network, closer to the data source. Hence, stream analytic pipelines benefit from efficient resource allocation policies to be deployed on edge-located nodes with limited resources. Moreover, each microservice's resource requirements might change with time, depending on various factors such as input data and traffic volume evolution.

SUMMARY

In some embodiments, a dynamic resource management allocator is provided for stream analytics, such as stream analytics for at edge devices. Described herein is a technique to dynamically manage resource allocation for stream analytic pipeline, aiming at optimizing the performance on resource-constrained edge nodes. The solutions described herein leverage reinforcement learning to find an optimal allocation policy for each microservice of the considered pipelines. To perform an exhaustive inspection of the system conditions, the computer implemented methods, systems and computer program products can analyze the resource profiles of both microservices and computing nodes, including in the model pipelines' topology features to trace the interactions between the various components. Considering the distinctive features of the addressed problem, the computer implemented methods, systems and computer program products can employ a specific variation of the standard Q-learning algorithm.

According to an aspect of the present invention, a computer implemented method is provided for resource management of stream analytics at each individual node that includes computing a mean of output processing rate of microservices in a pipeline, such as a pipeline at an edge node; and evaluating a state of each microservice of the microservices in the pipeline. The computer implemented method also includes selecting a single microservice from the pipeline for updating resources for an action that changes the state in single the microservice that is selected; and performing resource allocation update for the selected microservice. The computer implemented method may also include updating the state of the selected microservice with a resource allocation.

In accordance with another embodiment of the present disclosure, a system for resource management of stream analytics at each individual node is described that includes a hardware processor; and memory that stores a computer program product The computer program product when executed by the hardware processor, causes the hardware processor to compute a mean of output processing rate of microservices in a pipeline, such as a pipeline of an edge node; and evaluate a state of each microservice of the microservices in the pipeline. The system may also select a single microservice from the pipeline for updating resources for an action that changes the state in single the microservice that is selected; and perform resource allocation update for the selected microservice. The system may also update the state of the selected microservice with a resource allocation.

In accordance with yet another embodiment of the present disclosure a computer program product for resource management of stream analytics at each individual node, such as at each edge node. The computer program product can include a computer readable storage medium having computer readable program code embodied therewith. The program instructions executable by a hardware processor to cause the hardware processor to compute a mean of output processing rate of microservices in a pipeline. The computer program product when executed by the hardware processor can also cause the hardware processor to evaluate a state of each microservice of the microservices in the pipeline; and select a single microservice from the pipeline for updating resources for an action that changes the state in single the microservice that is selected. The computer program product can also perform resource allocation update for the selected microservice. The computer program product may also update the state of the selected microservice with a resource allocation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a table for metrics for compositing the resource allocator Q-L model state.

FIG. 6 is a table for the data from resource allocator performance evaluation tests.

DETAILED DESCRIPTION OF PREFERRED EMBODIMENTS

Figure 1:
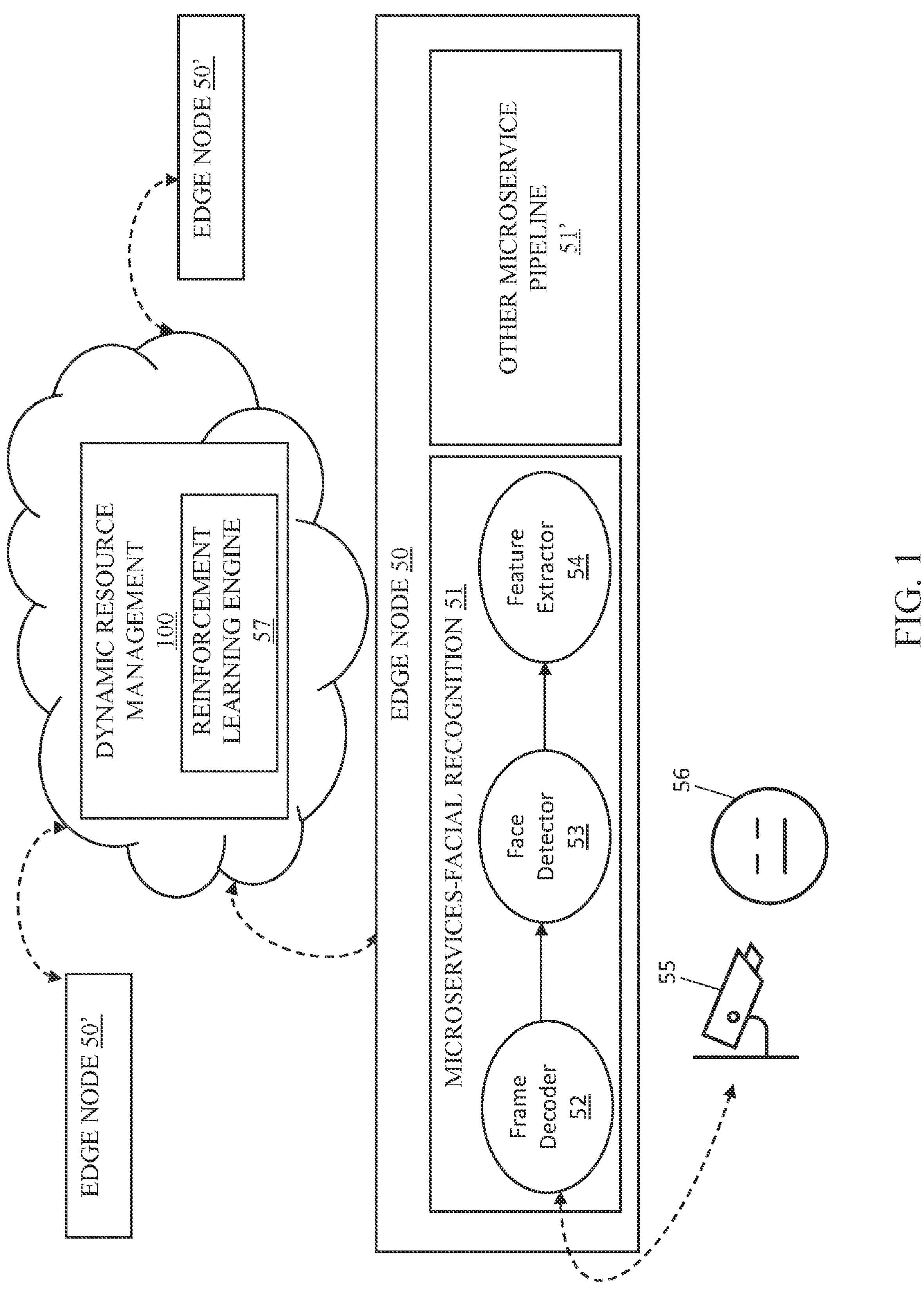
FIG. 1 is an illustration of a general environment depicting dynamic resource management for stream analytics at each individual node, in accordance with one embodiment of the present disclosure.

In accordance with embodiments of the present invention, systems and methods are provided for dynamic resource management for stream analytics. The stream analytics may be formed for each individual node of a distributed computing environment. For example, the stream analytics may be performed at the edge, i.e., at edge devices of a cloud computing environment. "Edge computing" is a distributed computing model that takes advantage of compute available outside of traditional and cloud data centers. An edge computing model places a workload closer to where the associated data is created and where actions are taken in response to analysis of that data. Placing data and workload on edge devices reduces latencies, lowers demands on network bandwidth, increases privacy of sensitive information, and enables operations during network disruptions. An "edge device" is a piece of equipment, such as an assembly machine on a factory floor, an ATM, an intelligent camera, or an automobile, that has integrated compute capacity on which meaningful work can be performed and data collected or produced. An "edge node" is any edge device, edge server, or edge gateway where edge computing takes place.

The volume of data coming from internet of things (IoT) devices and consumed by both users and analytical applications is growing, especially when considering video data streams and video analytics systems. Expansion of edge computing and the increasing adoption of computer vision and machine learning tools for various applications from security to healthcare and traffic monitoring, is causing growth in the video stream analytics market. The majority of video analytics applications are composed by pipelines, namely set of microservices interacting with each other. In some embodiments, each microservice handles a specific stream processing task, such as frame decoding, features detection and insights extraction. To enhance the performance while reducing the programming complexity, a recently growing trend is the adoption of serverless computing to deploy video analytic pipeline on the edge of the network, reducing the distance from data source and leveraging serverless flexibility and scalability to simplify pipelines' development and deployment process. With serverless computing, microservices are encapsulated into containerized environments, typically orchestrated by Kubernetes, and deployed in a set of instances that varies with traffic behavior.

"Serverless" does not mean there isn't a server. Serverless computing involves building and running applications that do not require server management. Instead, applications are bundled as one or more functions, uploaded to a platform, and then automatically executed and scaled as needed. Serverless evolved from the micro services paradigm. Serverless functions or workloads are controlled by the cloud—and the Kubernetes cluster will take care of deploying and running it when it's needed "Kubernetes" is an option available to deploy applications in large-scale infrastructures. Kubernetes is an example of a distributed system. Kubernetes treat all the machines in a cluster as a single pool of resources. Kubernetes take the role of a distributed operating system by effectively managing the scheduling, allocating the resources, monitoring the health of the infrastructure, and even maintaining the desired state of infrastructure and workloads. Kubernetes is an operating system capable of running modern applications across multiple clusters and infrastructures on cloud services and private data center environments. Kubernetes include two layers including of the head nodes and worker nodes. The head nodes typically run the control plane responsible for scheduling and managing the life cycle of workloads. The worker nodes act as the workhorses that run applications. The collection of head nodes and worker nodes becomes a cluster. The components of Kubernetes, can include a controller and scheduler.

When dealing with edge nodes, resource efficiency is a consideration. A challenge for serverless-based stream analytics is how to efficiently configure microservices' resources in a dynamic way. Resource needs for each stream processing component can rapidly vary over time. Described herein is a Reso Allocator, which is an intelligent resource manager that dynamically configures and updates resource configurations (namely, CPU and memory) for each microservice from various stream analytic pipelines.

The term "microservices" describes a method of architecting complex applications as a series of small, independent processes that communicate with each other using language-agnostic application programming interfaces (APIs). The term "Microservice Architecture" describes a particular way of software applications as suites of independently deployable services. These services can be small, highly decoupled and focus on performing a small task. The services can be are organized around capabilities, e.g. user interface frontend, recommendation, logistics, billing, etc.

FIG. 1 illustrates one embodiment of microservices being employed in a face recognition pipeline. In the example depicted in FIG. 1, a video recorder 55 creates a video stream including recorded faces. The video stream is received at a single node 50. For example, the facial recognition microservice pipeline 51 is performed on the single edge node 50, i.e., in this example of an edge-based use-case, the microservices belonging to a specific pipeline are residing on the same node. This pipeline 51 is composed of three microservices, a frames decoder 52 to decode the video stream into a sequence of frames, which is sent then as input to the faces detector 53. The face detector 53 detects faces in each frame, translating them as bounding boxes. These bounding boxes are then processed by the features extractor 54 to extract the required features and informations for the face recognition task. In this example, the microservices may include a frames decoder 52, face detector 53, and a feature extractor 54.

A traditional deployment of these stream analytics applications on a cloud infrastructure via virtual machines can incur into increased delays and costs, reducing the achievable parallelism. For this reason, an alternative deployment model such as serverless computing is gaining more and more popularity for stream analytics and video processing.

Serverless computing, in which microservices are containerized and automatically managed by the platform, allows developers to only focus on the application logic, without additional planning required for microservices' lifecycle and deployment. In some embodiments, with serverless computing, the hosting platform is responsible of the infrastructure maintenance. Hence, the naturally parallelizable structure of stream analytic pipelines is perfectly compatible with the highly parallel and fine grained serverless computing paradigm, to deploy efficient applications for stream processing and analytics. In this scenario, the serverless platform requires an efficient resource allocation mechanism for the hosted microservices, especially when dealing with edge infrastructures, very common for both serverless computing and stream analytics.

Still referring to FIG. 1, the allocator, e.g., dynamic resource management engine 100, described herein analyzes each pipeline, e.g., the facial recognition microservice pipeline 51, which is hosted within a single edge Kubernetes node 1, e.g., single edge node 50, considering various features for each microservice, such as resource usage and type of interaction with the other pipeline's stages, such as those on other nodes 50' or other microservice pipelines 51' on the same node.

In some embodiments, the dynamic resource management engine 100 employs Reinforcement Learning (RL), e.g., a reinforcement learning engine 57, to continuously learn the best allocation policy. An "allocation policy" describes when, where, and how compute resources should be allocated for the Job. For example, to continuously learn the best allocation policy, the reinforcement learning engine 57 can operate on multiple video analytic pipelines 51, 51' with different features.

Hence, the contribution of this work is two-fold: First, a dynamic, resource allocation technique is provided that is aimed at maximizing the overall pipelines processing rate, measured in messages per second (msg/s). Second, a modification has been made to a standard Q-Learning training workflow, in which specific features of a use case are considered, and analytic pipelines composed by multiple microservices are streamed to gain efficiency in the training process while keeping track of causality in the system.

Turning first to dynamic resource allocation, the performance of resource allocator 100 is compared to other resource allocation strategies. For example, the resource allocator 100 may be compared to a default resource configuration statically set by a cluster administrator, an unrestricted strategy in which every microservice has neither CPU nor memory allocation limits, and a scenario in which resource allocation is managed by Kubernetes Vertical Pod Autoscaler (VPA). Evaluation shows that the resource allocator 100 of the computer implemented method, systems and computer program products that are described herein can outperform the above listed alternative resource allocation strategies for various pipeline types, in two different edge scenarios, providing up to a 300% increase of the overall processing rate.

Turning to the Q-Learning training workflow, a modification of the standard Q-Learning training workflow is provided in which the specific features of the use case is considered, and analytic pipelines are streamed composed by multiple microservices, to gain efficiency in the training process while keeping track of causality in the system. This reduce the number of updates in the workflow by adding multiple evaluation of the environment state, i.e., the pipeline's microservices features, within the same iteration.

In some embodiments, to solve the challenge of dynamic resource allocation for serverless stream analytic pipelines, the methods, systems and computer program products described herein rely on reinforcement learning (RL) theory, namely, with a Q-Learning approach. The Q-learning approach may be used to map states to action in order to maximize a reward. "States" are a representation of the environment of a task, i.e., microservice. An "action" is what an agent can do in each state. When an agent, e.g., resource allocator 100, takes an action in a state, it receives a reward. The term "reward" describes feedback from the environment. A reward can be positive or negative. When the reward is positive, it corresponds to our normal meaning of reward. When the reward is negative, it corresponds to "punishment."

Q-learning (QL) is an off-policy reinforcement learning method that updates actions' value following Bellman's optimal equation and an ε-greedy strategy. During the training phase, the QL agent can choose between a random action (exploration) or the current best action (exploitation), that is the action with the highest Q-value stored in lookup table, called Q-table (or hash table). The probability of exploration is regulated via the ε coefficient, that usually decreases over the training iterations. Using Bellman's equation, Q-learning aims at approximating the optimal action-value function Q* in an incremental way, as shown below in Equation 1:

$$Q(s_t,a_t)\leftarrow(1-a)Q(s_t,a_t)+a[r_t+\gamma\max_a Q(s_t+1,a)] \quad \text{Equation (1)}$$

For each time step t, $r_t$ is the immediate reward when shifting from the current state $s_t$ to the next state $s_t$+l. In the above equations, a is the learning rate and is the discount factor, configured to regulate the influence of immediate and long-term rewards.

The resource allocator 100 of the present disclosure is based upon Q-learning theory with the goal of maximizing the pipelines output processing rate, i.e., the processing rate of each pipeline's final microservice, in messages per second (MSG/s).

In a reinforcement learning model, the environment with which the agent is interacting needs to be described by a "state". Machine learning can be divided into three categories depending upon the feedback available for the algorithm to learn over time. The objective of supervised learning is to learn a function that can map the input to output, exploiting from a labeled set of training data. In contrast, unsupervised learning is about learning undetected patterns in the data, through exploration without any pre-existing labels. Finally, the goal of reinforcement learning is to maximize the cumulative reward by taking "actions" in an environment, balancing between exploration and exploitation. Reinforcement learning is a machine learning training method based on rewarding desired behaviors and punishing undesired ones. In general, a reinforcement learning agent—the entity being trained—is able to perceive and interpret its environment, take actions and learn through trial and error.

In a complex scenario, such as serverless stream analytics, each microservice within a pipeline is characterized by many features. Considering a data platform 100 without loss of generality, for a resource type (e.g., CPU, memory) every microservice has an allocated resource quota on the hosting computing node 51 where the pipeline is located, and a certain usage quota of the allocated resource amount. Moreover, a microservice is interacting with other connected microservices in the same pipeline. For example, as illustrated in FIG. 1, the face detector 53 is consuming, i.e., processing, messages that are produced by frames decoder 52. Subsequently, the face detector 53 is producing messaged that are going to be processed by the feature extractor 54. Hence, for each microservice within a pipeline 51, there is informative to trace the amount of messages exchanged between microservices, taking into account that each one can consume or produce messages from/to multiple microservices.

Figure 2:
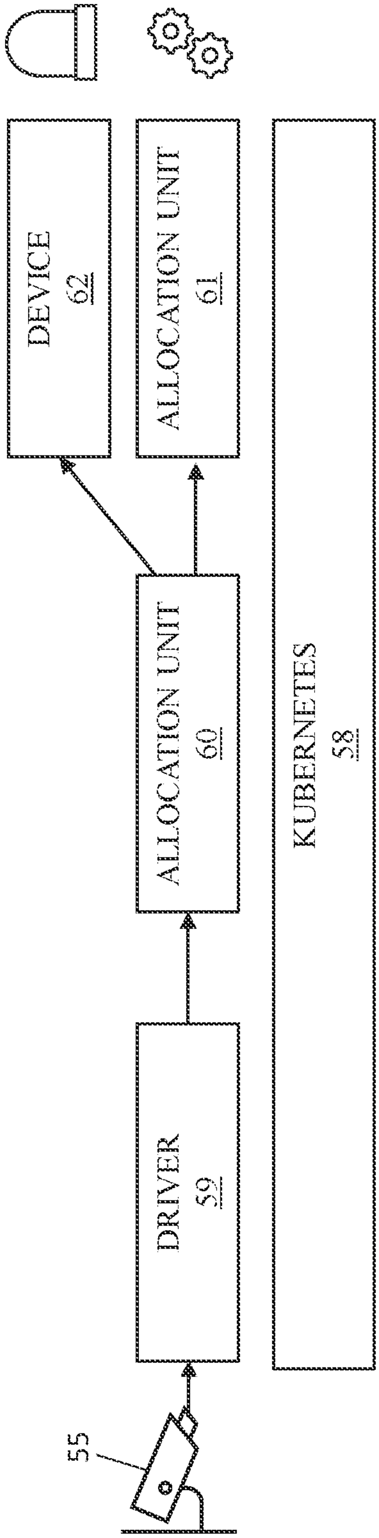
FIG. 2 is an illustration depicting tracking information from a pipeline of microservices with a resource allocator of the dynamic resource management system, in accordance with one embodiment of the present disclosure.

Referring to FIG. 2, it is also advantageous to be aware of the position of a component in a pipeline, whether it is a driver 59, an internal or terminal allocation unit (AU) 60, 61 or a device 62. Hence, to trace all the informative features characterizing a microservice in the resource allocator 100, the environment state is defined as listed in Table 1, as depicted in FIG. 3. FIG. 3 includes a table for metrics for compositing the data allocator Q-L model state.

In the example illustrated in FIG. 3, all state features are discretized, as shown in Table 1, equally parting the percentage range from 0% to 100% obtained from each of the considered features. For microservice resource allocation, intervals are considered for the considered edge use-case. Dealing with resource-constrained nodes, the resource allocator 100 employs a fine resolution of the microservices resource allocation profiles. Moreover, a narrower set of possible states is set for reachability, because of the considered use-case in which no more than 3 final stages for pipeline are present. Hence, the rounded ranges are 0%-33.3%, 33.3%-66.6%, 66.6%-100%.

The idea behind Reinforcement Learning is that an agent will learn from the environment by interacting with it and receiving rewards for performing actions. In some embodiments, the action space includes 11 different actions, namely: to increase the resource allocated quota of a percentage in 10%, 20%, 30%, 40%, 50%, to decrease the resource allocated quota of a percentage in 10%, 20%, 30%, 40%, 50% or to leave it unchanged.

Regarding the immediate reward for an action, it is defined in a straightforward way as the difference between the resulting output processing rate for the pipeline of the updated microservice and its previous value, amplified by 100, to trace whether or not the action has lead to a positive impact in the interested pipeline.

The considered state space is very big, e.g., having potentially greater than 450000 possible combinations, and the resulting Q-table is significantly sparse, because the majority of the space set is made of rare combination not common in the considered use case. For this reason, the model can lead to good results in a reduced number of training iterations. In some examples, a stream analytic pipeline in the data allocator 100 can have from one (1) to three (3) final microservices, each one with its own processing rate, that can significantly differ from one to another. To equalize the weights of all the final pipelines stages in a node, the model considers a harmonic mean. The output processing rate, defined as in Equation 2, given N final microservices:

$$\text{output} = \frac{N}{\sum_{i=1}^{N} \frac{1}{\text{rate}_i}} \qquad \text{Equation (2)}$$

FIG. 3 illustrates one embodiment of a model workflow for the resource allocator 100, in accordance with one embodiment of the present disclosure. In a standard Q-Learning model, each iteration leads to the choice of an action (randomly, or based on the Q-values following the E-greedy strategy), the evaluation of the state and the update of the Q-Table. Nevertheless, in a stream analytics at the edge scenario, it has been determined that this approach to be unfeasible for multiple reasons. For example, edge nodes are resource constrained by definition. Hence, updating the resource allocation quota for each microservice in the node could increase the risk of resource starvation and instabilities. Further, a resource update requires multiple seconds (AJ 15s) to be performed and validated on the microservice's pods. Hence, the sequential update of all the microservices included in the pipeline could deteriorate the pipeline's processing performance, due to the increased latency.

Due to the complexity of stream analytics pipelines, where multiple stages are interacting and exchanging data streams with each other, to perform multiple updates on the same pipeline would complicate the analysis of potential causality between performed updates and the evolution of the output processing rate, slowing the learning process of the agent, i.e., resource allocator 100.

In the computer implemented methods, systems and compute program products of the present disclosure, a modified Q-Leaning workflow is employed that takes in account the specific features of our challenge scenario for better efficiency. In one embodiment, for each iteration, the resource allocator 100 performs the following, as illustrated in FIGS. 4 and 5.

Figure 4:
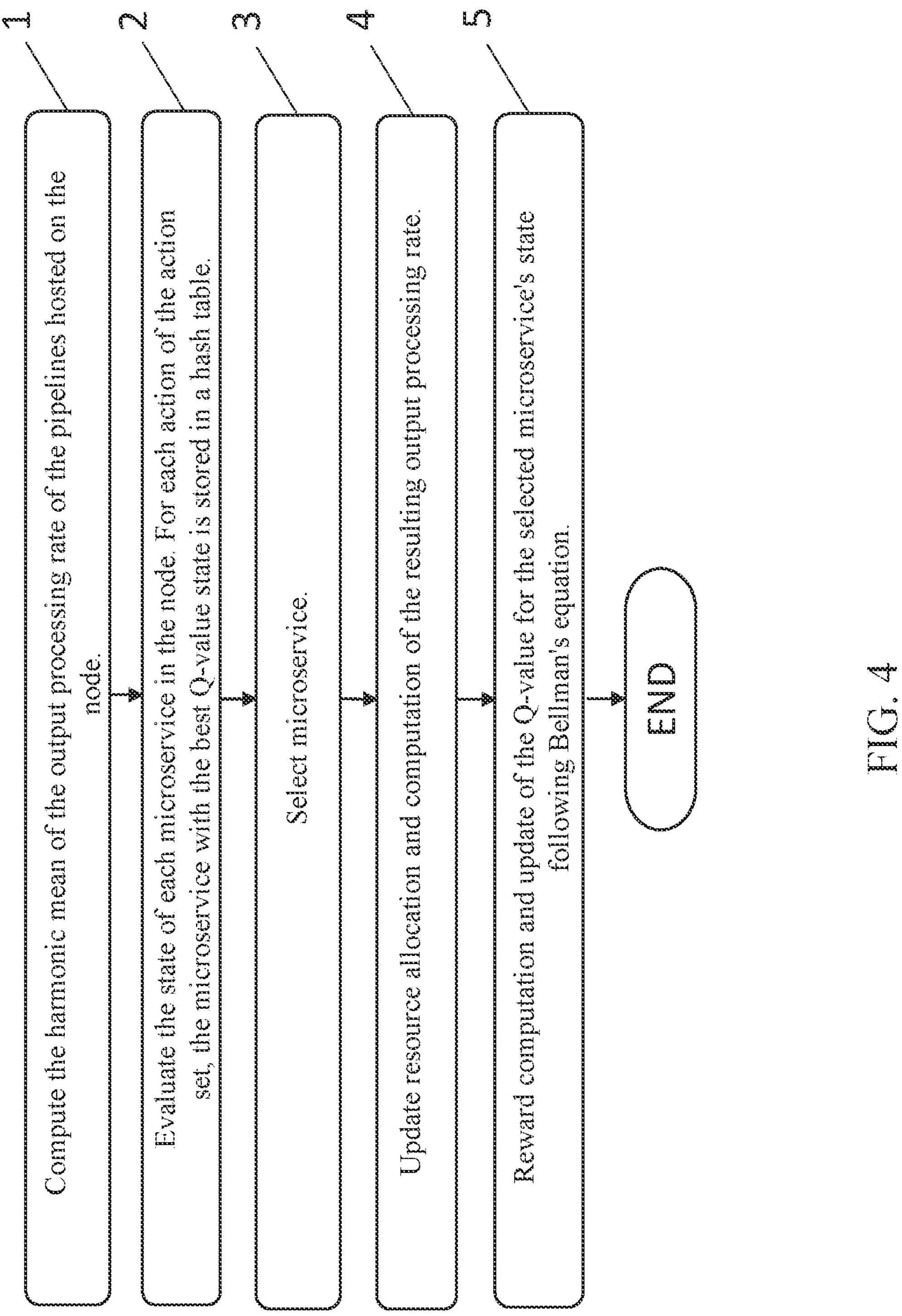
FIG. 4 is a block/flow diagram of an exemplary method for a modified Q-Leaning workflow, in accordance with one embodiment of the present disclosure.
Figure 5:
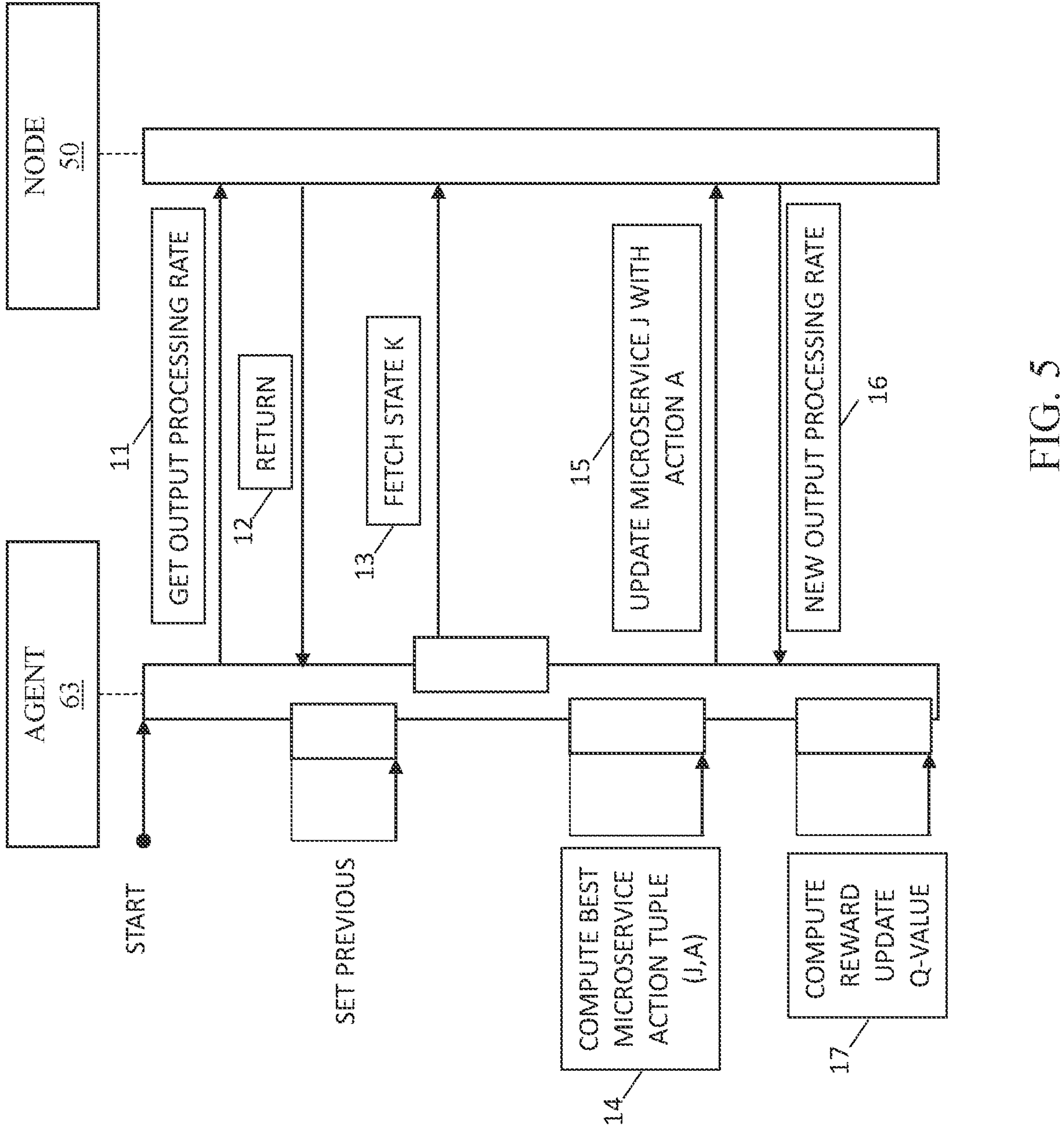
FIG. 5 is an illustration of a sequence diagram for the resource allocator for an iteration of microservices in a pipeline for object tracking and facial recognition.

Referring to FIG. 4, the method may begin at block 1 with the computation of the harmonic mean of the output processing rate of the pipelines hosted on the node. As illustrated in FIG. 5, this is illustrated at blocks 11 and 12, which illustrate the agent 63 interacting with the node 51 to provide the mean of the output processing rate, e.g., in messages per second (MSG/s).

Referring to block 2 of FIG. 4, the method may continue with the evaluation of the state of each microservice in the node. For each action of the action set, the microservice with the best Q-value state is stored in a hash table. As illustrated in FIG. 5, this is illustrated at block 13, which illustrate the agent 63 interacting with the node 50 to fetch state K.

Referring to block 3 of FIG. 4, the method may continue with the evaluation of the state of each microservice in the node. Microservice selection may include an exploration mode and an exploitation mode. In exploration mode, the microservice to update is the best one for the randomly picked action, stored in the hash table. In exploitation mode, the microservice with the maximum Q-value in the hash table is selected. As illustrated in FIG. 5, this is illustrated at block 14, which illustrates the agent 63 computing the bet microservice action tuple (J,A).

Referring to block 4 of FIG. 4, the method for the resource allocator 100 can continue with a resource allocation update and computation of the resulting output processing rate. As illustrated in FIG. 5, this is illustrated at block 15, the agent 63 can update the microservice J on the node 50 with action A.

Referring to block 5 of FIG. 4, the method for the resource allocator 100 can continue with a reward computation and update of the Q-value for the selected microservice's state, following Bellman's equation. The Bellman's equation tells that the value of an action in some state is the immediate reward you get for taking that action, to which you add the maximum expected reward you can get in the next state. As illustrated in FIG. 5, this is illustrated at block 16, the agent 63 can receive a new output processing rate from the node 50. FIG. 5 further illustrates computing the reward with an updated Q-learning value at 17.

The workflow illustrated by FIGS. 4 and 5 leads to reduced latency and increased efficiency by letting the resource allocator 100 operate only on the most convenient microservice, e.g., the microservice with the greatest expected gain in terms of increased processing rate, at each iteration, without loading the edge node with multiple updates at a time on the same pipeline. Moreover, by updating only one microservice at a time, it is easier for resource allocator 100 to fetch and learn the influences of the chosen actions on the final output at each iteration.

Referring to FIG. 2, model implementation includes development and tested on the resource allocator 100, a Kubernetes-based serverless platform, i.e., identified by reference number 58, to fetch, merge and process data streams from various internet of things (IoT) devices, mainly video cameras 55. The resource allocator 100 extends the Kubernetes application programming interface (API) with an Operator that, relying on some custom resources, deploys and manages the stream analytic pipelines 51, 51', as illustrated in FIG. 1. In the resource allocator 100, the components, i.e., the microservices 52, 53, 54, of a pipeline 51, 51' are labelled and exposed to the developers as three different abstractions. For example, referring to FIG. 2, the three different abstractions can include drivers 59, analytics units (AU) 60, 61 and devices 62 (which may also be referred to as gadgets).

As shown in FIG. 2, the driver 59 fetches the incoming data from external sensors (e.g., a video camera 55) to create a stream that is subsequently processed by one or more analytics units (AU) 60, 61 to extract the target information and eventually create an augmented stream. A pipeline's final stage can include analytics units (AU), to send as output the extracted information for further external use, or some devices 62 (also referred to as Gadgets), that control various actuators.

In some 100, the resource allocator 100 makes use of pull-based communication method in which consumers fetch messages from producers, i.e., the preceding stage of the pipeline 51, 51'. In some embodiments, the resource allocator 100 is developed with the goal of maximizing the amount of stream messages consumed in the final stage of each pipeline 51, 51', by allocating resources in a dynamic and efficient way. To solve this challenge, the resource allocator 100 keep tracks of the various features of each microservice 52, 52, 54 in each edge node 50 of the cluster, considering in addition its position in the pipeline 51, 51' and its interactions with the other interconnected microservices.

Figure 7:
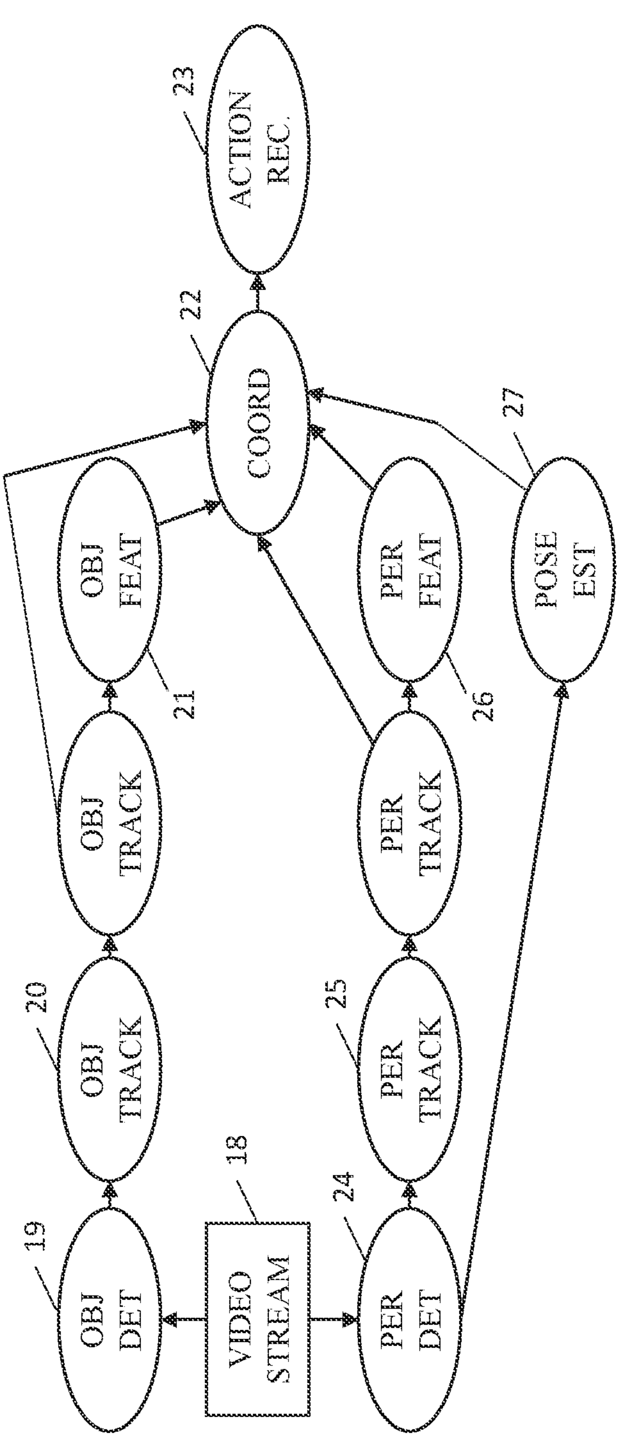
FIG. 7 is a diagram of an action recognition pipeline, in accordance with one embodiment of the present disclosure.

Evaluation of a resource allocator 100 has been conducted with 4 different tests, with varying features and input types, listed in Table 2, which is provided in FIG. 6. The four tests are executed on 4 distinct nodes 50 and based on two types of pipelines 51, 51'. The pipelines are operating on two different input videos with different characteristics, labelled as "Holiday" and "TV News". The input video "Holiday" was a video of a party with very sparse recognizable faces on average 2-3 every 15 seconds, whereas "TV News" has a video that had a higher amount of recognizable faces, i.e., 2-3 faces/frame on average. The first pipeline, Action Recognition[AR], is characterized by a complex topology, in which 12 microservices are interconnected on the same edge node, as shown in FIG. 7. FIG. 7 illustrates pipelines of microservices in an action recognition pipeline. The pipeline of microservices receives a video stream 18. There are two strings of microservices one for tacking object and on for tracking faces. For example, in one string from the stream 18, a first microservice is an object detector (OBJ DET) 19, which is followed by other microservices, such as an object trackers (OBJ TRACK) 20, that feed into an object feature extractor (OBJ FEAT) 21. For example, in a second string from the stream 18, a first microservice is an person detector (PER DET) 24, which is followed by other microservices, such as an objector trackers (PER TRACK) 25, that feed into an object person extractor (PER FEAT) 26. The microservices of the object person extractor (PER FEAT) 26 and the object feature extractor (OBJ FEAT) 21 feed into a coordinator (COORD) 22, which feeds into an action recommender (ACTION REC) 23. Another branch includes a pose estimator (POSE EST) 27 that receives messages from the person detector (PER DET) 24, in which the pose estimator (POSE EST) 27 feeds into the coordinator (COORD) 22.

This pipeline is deployed on the most powerful edge node of the 4 used in the tests. Action Recognition (AR) is processing the video input "Holiday" in the test AR described in Table 2. The second pipeline, Face Recognition (FR1), includes 4 microservices, as in the example shown in Table 2. Given the implementation on the resource allocator 100, the aforementioned Face Recognition pipeline is deployed with four resource allocation 100 microservices, in the following order: driver, faces, faces-features and faces-matches. Face Recognition (FR) is deployed on 3 different tests:

FR1: One Face Recognition pipeline processing the video input "Holiday"

FR2: One Face Recognition pipeline processing the video input "TV News".

FR3: Two Face Recognition pipelines, one processing the video input "TV News", the other processing the video input "Holiday".

For all the tests, the performance evaluation is conducted by collecting the averaged pipelines' output processing rate over a 1 hour window, considering the following resource allocation strategies, for CPU and memory:

Manual: static allocation of 0.5 CPU cores and 2 GB of memory for all the microservices in the pipelines, manually defined.

Unrestricted: A minimal allocation of 0.1 CPU cores and 1 GB of memory is set for each microservices, while no limits are set. This means that the Kubernetes control plane can opt to freely increase the quota of CPU and memory for each pod on the node, without restrictions.

VPA: Kubernetes Vertical Pod Autoscaler (VPA) recommends and eventually applies resource allocation updates by monitoring resource utilization of the target deployment. To avoid unfeasible allocation settings, developers can configure a minimum and a maximum allowed for the VPA to range within. In the experimentation, the minimum was set to 0.2 CPU cores and 1 GB of memory, the maximum to 4 CPU cores and 4 GB of memory. Resource allocator 100: dynamic CPU and memory allocation updates performed with the policy learnt after a training phase of 500 iterations.

Figure 8:
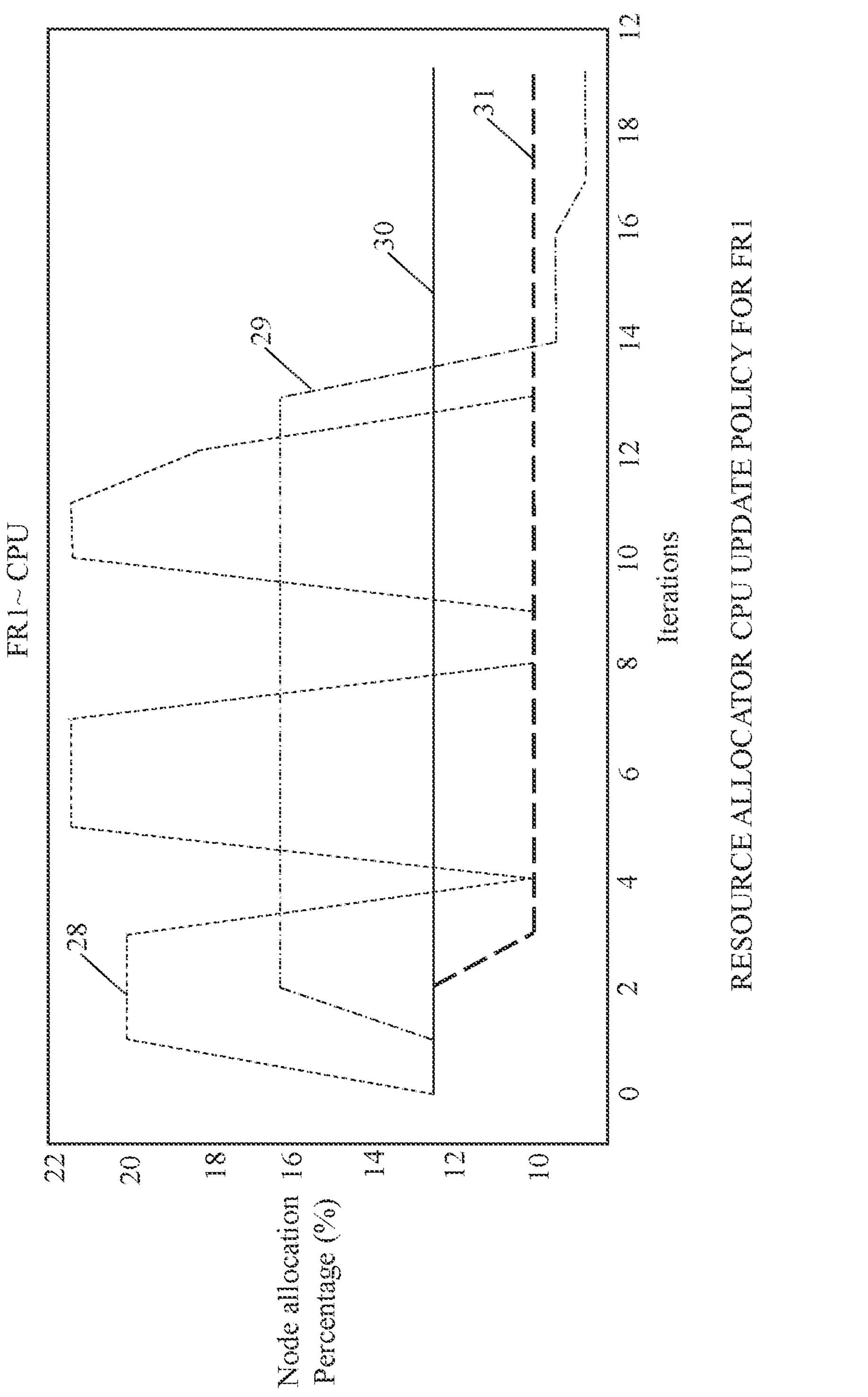
FIG. 8 is a plot illustrating CPU update policy for a resource allocator, in accordance with one embodiment of the present disclosure.

To show an example of the resource allocator 100 strategy, FIG. 8 depicts the evolution of the CPU allocation, showed as percentage of the hosting node's total CPU amount, for test FRI. In FIG. 8, the plot identified by reference number 28 is the faces-features, the plot identified by reference number 29 is the driver, the plot identified by reference number 30 is the faces, and the plot identified by reference number 31 is the face-matches. It can be seen how the resource allocator 100 performs differing updates depending on the considered Face Recognition's microservice. It explores with more allocation updates the microservice directly connected to the pipeline's final stage, i.e., faces-features. In the last 5 iterations, 3 of 4 components are stable, whereas the driver CPU quota is slightly reduced.

Figure 9:
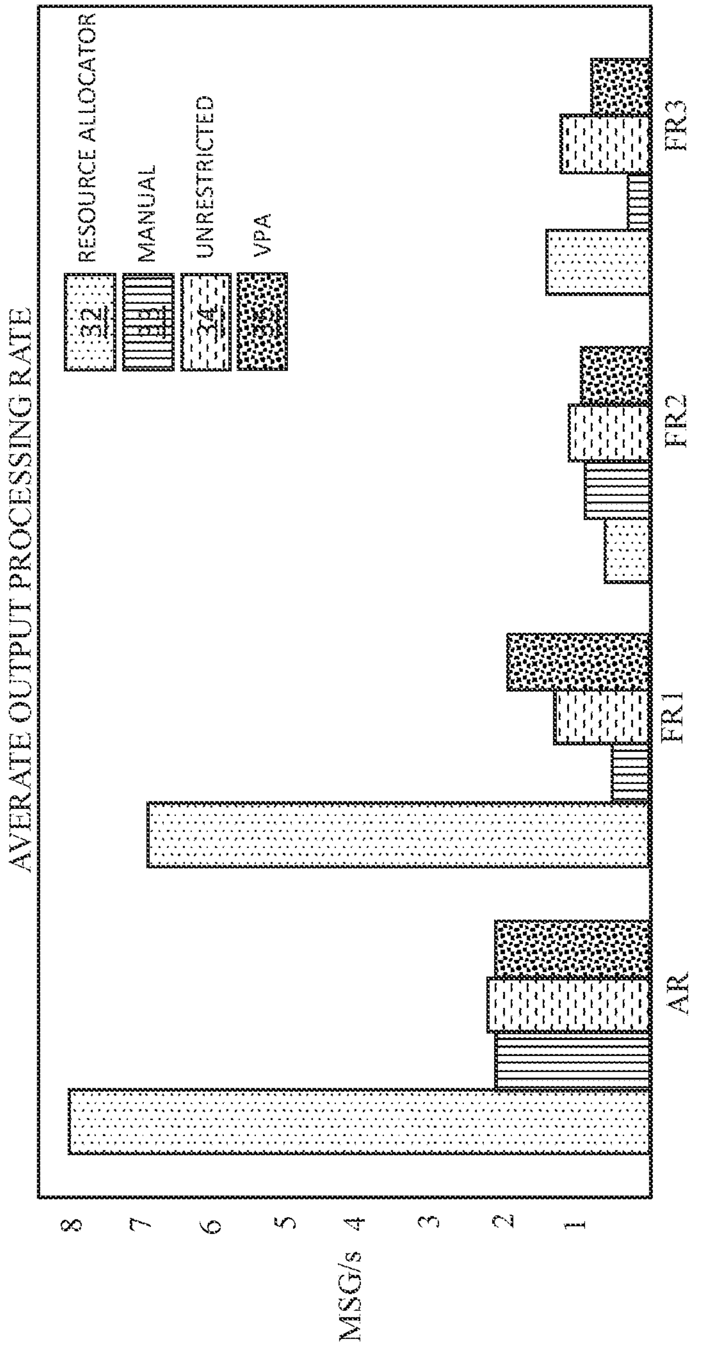
FIG. 9 is a plot of performance evaluation results.

FIG. 9 shows the aggregated results for the considered tests, in terms of average output processing rate, i.e., in messages per second (MSG/s). The plot for the resource allocator 100 is illustrated in the key as reference number 32. The plot for manual is illustrated in the key as reference number 33. The plot for unrestricted is illustrated in the key as reference number 34. The plot for VPA is illustrated in the key as reference number 35. The performance comparison shows a clear advantage for AR and FRI in the usage of the resource allocator 100, that triples the resulting average output processing rate of the 2 pipelines with respect to the Unrestricted strategy. In FR3 too, the resource allocator 100 is obtaining the best outcome overall, even if with a smaller gap with respect to FRI e AR, specially when comparing resource allocator's 100 result with the Unrestricted strategy.

From FR2, it can be seen that resource allocator 100 is not performing well with respect to the alternatives. The results obtained from FR2 and FR3 can be attributed to the fact that the Allocator 100, after 500 training iterations on Face Recognition and Action Recognition for Holiday" and "TV News" input videos, has learnt an effective policy for nodes hosting "Holiday" processing pipelines, but it is still immature when operating on "TV News" processing pipelines, hence suffering from the higher processing volume required by this type of input. In fact, the result obtained in FR3 is highly influenced by the presence of two pipelines residing on the considered node, operating in parallel on the two different input videos. The overall on average performance obtained on the 4 nodes leads to an advantage in the usage of resource allocator 100 with respect to other standard resource allocation strategies.

Disclosed herein is a novel reinforcement-learning based approach to dynamically allocate CPU and memory to stream analytic pipelines hosted on resource-constrained edge nodes. A fine grained monitoring has been provided not only of microservices and hosting nodes' resource usage profile, but also of the pipelines' specific topology and interactions, can successfully define a Q-learning policy for increased processing rate. In fact, that resource allocator 100, i.e., the QL-trained dynamic resource allocator, outperforms many alternative allocation strategies, on pipelines of varying complexity.

Figure 10:
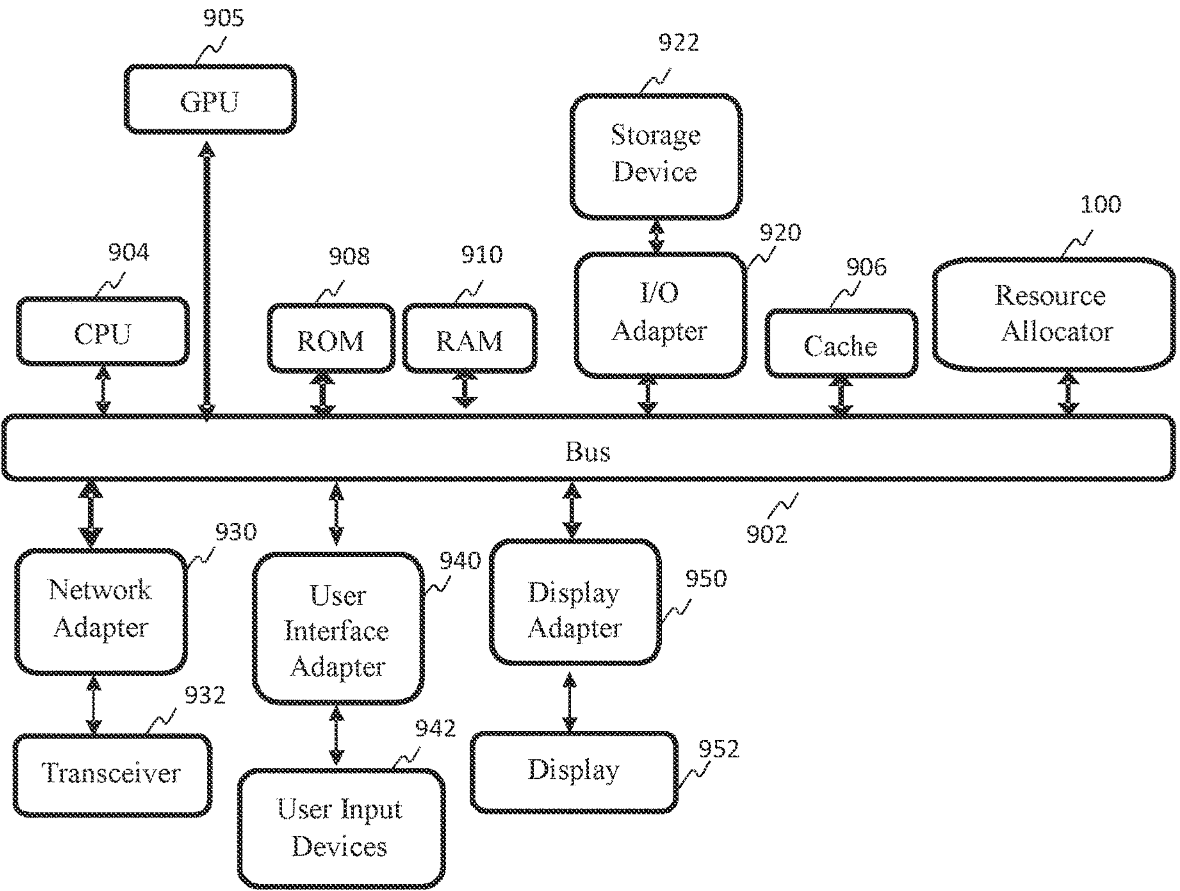
FIG. 10 is a block/flow diagram of an exemplary processing system for dynamic resource management for stream analytics, in accordance with embodiments of the present invention.

FIG. 10 is an exemplary processing system for a resource allocator 100 used in dynamic resource management for stream analytics at the edge, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, element 100 is a resource allocator 100 following FIGS. 1-7.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for resource management of stream analytics at each individual node comprising:

computing a mean of output processing rate of microservices in a pipeline;

evaluating a state of each microservice of the microservices in the pipeline, wherein the evaluating of the state employs a Q-learning workflow of a reinforcement learning (RL) method;

selecting a single microservice from the pipeline for updating resources for an action that changes the state in the single microservice that is selected, wherein in exploitation mode the microservice with a maximum Q-value is selected from the Q-learning workflow, wherein a Q-value illustrates a positive change in state for an allocation change;

performing resource allocation updates for the selected microservice; and updating the state of the selected microservice with a chosen resource allocation.

2. The computer implemented method of claim 1, wherein the evaluating of the state of each activation state comprising storing a best Q-value for the each microservice.

3. The computer implemented method of claim 1, wherein in exploration mode to select the microservice for updating resources, the microservice for updating the resources is selected randomly.

4. The computer implemented method of claim 1, wherein performing the resource allocation updates includes computing an expected output processing rate.

5. The computer implemented method of claim 1, wherein the updating the state of the selected microservice with the resource allocation includes a reward computation and updating of a Q-value for the selected microservice using a Bellman's equation.

6. The computer implemented method of claim 1, wherein the resources are selected from nodes by availability of CPU cores and random access memory (RAM) availability.

7. The computer implemented method of claim 1, wherein the microservices are directed towards object identification from a video stream.

8. The computer implemented method of claim 7, wherein the object identification is facial recognition.

9. A system for resource management of stream analytics at each individual node comprising:

a hardware processor; and a memory that stores a computer program product, the computer program product when executed by the hardware processor, causes the hardware processor to:

compute a mean of output processing rate of microservices in a pipeline;

evaluate a state of each microservice of the microservices in the pipeline, wherein the evaluate of the state employs a Q-learning workflow of a reinforcement learning (RL) method;

select a single microservice from the pipeline for updating resources for an action that changes the state in the single microservice that is selected, wherein in exploitation mode the microservice with a maximum Q-value is selected from the Q-learning workflow, where a Q-value illustrates a positive change in state for an allocation change;

perform resource allocation updates for the selected microservice; and update the state of the selected microservice with a chosen resource allocation.

10. The system of claim 9, wherein the evaluate of the state of each activation state comprising storing a best Q-value for the each microservice.

11. The system of claim 9, wherein in exploration mode to select the microservice for updating resources, the microservice for updating the resources is selected randomly.

12. The system of claim 9, wherein the perform the resource allocation updates includes computing an expected output processing rate.

13. The system of claim 9, wherein the updating the state of the selected microservice with the resource allocation includes a reward computation and updating of a Q-value for the selected microservice using a Bellman's equation.

14. The system of claim 9, wherein the resources are selected from nodes by availability of CPU cores and random access memory (RAM) availability.

15. The system of claim 9, wherein the microservices are directed towards object identification from a video stream.

16. A computer program product for resource management of stream analytics at each individual node comprising a computer readable storage medium having computer readable program code embodied therewith the computer readable program code executable by a hardware processor to cause the hardware processor to:

compute, using the hardware processor, a mean of output processing rate of microservices in pipeline of edge node;

evaluate, using the hardware processor, a state of each microservice of the microservices in the pipeline, wherein the evaluate of the state employs a Q-learning workflow of a reinforcement learning (RL) method;

select, using the hardware processor, a single microservice from the pipeline for updating resources for an action that changes the state in the single microservice that is selected, wherein in exploitation mode the microservice with a maximum Q-value is selected from the Q-learning workflow, wherein a Q-value illustrates a positive change in state for an allocation change;

perform, using the hardware processor, resource allocation update for the selected microservice; and update, using the hardware processor, the state of the selected microservice with a chosen resource allocation.

* * * * *